(12) United States Patent
Lee

(10) Patent No.: US 7,859,782 B1
(45) Date of Patent: *Dec. 28, 2010

(54) SELECTING HIGHEST RELIABILITY SYNC MARK IN A SYNC MARK WINDOW OF A SPIRAL SERVO TRACK CROSSING

(75) Inventor: Tehri S. Lee, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 319 days.

This patent is subject to a terminal disclaimer.

(21) Appl. No.: 12/122,707

(22) Filed: May 18, 2008

(51) Int. Cl.
*G11B 5/09* (2006.01)
(52) U.S. Cl. ...................................................... 360/51
(58) Field of Classification Search .................. 360/51, 360/39, 31, 75, 48
See application file for complete search history.

(56) References Cited

U.S. PATENT DOCUMENTS

| | | | |
|---|---|---|---|
| 5,430,661 A | 7/1995 | Fisher et al. | |
| 5,576,906 A | 11/1996 | Fisher et al. | |
| 5,583,712 A | 12/1996 | Brunelle | |
| 5,668,679 A | 9/1997 | Swearingen et al. | |
| 5,696,639 A | 12/1997 | Spurbeck et al. | |
| 5,754,353 A | 5/1998 | Behrens et al. | |
| 5,761,212 A | 6/1998 | Foland, Jr. et al. | |
| 5,831,888 A | 11/1998 | Glover | |
| 5,838,512 A | 11/1998 | Okazaki | |
| 5,917,670 A | 6/1999 | Scaramuzzo et al. | |
| 6,021,012 A | 2/2000 | Bang | |
| 6,023,386 A | 2/2000 | Reed et al. | |
| 6,091,564 A | 7/2000 | Codilian et al. | |
| 6,101,229 A | 8/2000 | Glover | |
| 6,181,506 B1 | 1/2001 | Shimura et al. | |
| 6,249,896 B1 | 6/2001 | Ho et al. | |
| 6,272,194 B1 | 8/2001 | Sakamoto | |
| 6,292,318 B1 | 9/2001 | Hayashi | |
| 6,304,407 B1 | 10/2001 | Baker et al. | |
| 6,411,452 B1 | 6/2002 | Cloke | |
| 6,411,453 B1 | 6/2002 | Chainer et al. | |
| 6,429,989 B1 | 8/2002 | Schultz et al. | |
| 6,487,032 B1 | 11/2002 | Cloke et al. | |
| 6,507,450 B1 | 1/2003 | Elliott | |
| 6,519,107 B1 | 2/2003 | Ehrlich et al. | |
| 6,587,293 B1 | 7/2003 | Ding et al. | |
| 6,603,622 B1 | 8/2003 | Christiansen et al. | |
| 6,704,156 B1 | 3/2004 | Baker et al. | |
| 6,738,205 B1 | 5/2004 | Moran et al. | |
| 6,791,777 B2 | 9/2004 | Watanabe et al. | |
| 6,882,486 B1 | 4/2005 | Kupferman | |
| 6,943,978 B1 | 9/2005 | Lee | |
| 6,965,489 B1 | 11/2005 | Lee et al. | |
| 6,967,799 B1 | 11/2005 | Lee | |
| 6,985,316 B1 | 1/2006 | Liikanen et al. | |
| 6,987,636 B1* | 1/2006 | Chue et al. | 360/75 |
| 6,989,954 B1 | 1/2006 | Lee et al. | |

(Continued)

*Primary Examiner*—Fred Tzeng

(57) ABSTRACT

A method is disclosed for demodulating a spiral servo track recorded on a disk of a disk drive. The spiral servo track comprises a high frequency signal interrupted by a sync mark at a sync mark interval. A demodulation window is enabled relative to a spiral servo track crossing, and a plurality of sync marks are detected in a sync mark window of the demodulation window. A reliability metric is generated for each of the detected sync marks, wherein the reliability metrics are evaluated to select one of the detected sync marks. A clock is synchronized in response to the selected sync mark.

16 Claims, 9 Drawing Sheets

U.S. PATENT DOCUMENTS

| | | |
|---|---|---|
| 7,002,761 B1 | 2/2006 | Sutardja et al. |
| 7,016,134 B1 | 3/2006 | Agarwal et al. |
| 7,019,937 B1 | 3/2006 | Liikanen et al. |
| 7,023,631 B2 | 4/2006 | Zhang et al. |
| 7,054,083 B2 | 5/2006 | Ehrlich |
| 7,068,459 B1 * | 6/2006 | Cloke et al. .................. 360/75 |
| 7,068,461 B1 | 6/2006 | Chue et al. |
| 7,088,533 B1 | 8/2006 | Shepherd et al. |
| 7,136,253 B1 | 11/2006 | Liikanen et al. |
| 7,193,797 B1 | 3/2007 | Sun et al. |
| 7,212,364 B1 | 5/2007 | Lee |
| 7,230,786 B1 | 6/2007 | Ray et al. |
| 7,248,426 B1 * | 7/2007 | Weerasooriya et al. ........ 360/51 |
| 7,301,717 B1 | 11/2007 | Lee et al. |
| 7,307,806 B1 | 12/2007 | Sutardja et al. |
| 7,391,583 B1 | 6/2008 | Sheh et al. |
| 7,433,143 B1 * | 10/2008 | Ying et al. .................... 360/51 |
| 2001/0010604 A1 | 8/2001 | Esumi |
| 2003/0030929 A1 | 2/2003 | Ozdemir |
| 2006/0171059 A1 | 8/2006 | Chan et al. |
| 2007/0165319 A1 | 7/2007 | Fisher |
| 2007/0211367 A1 | 9/2007 | Lau et al. |
| 2009/0244765 A1 * | 10/2009 | Albrecht ..................... 360/75 |

* cited by examiner

US 7,859,782 B1

SELECTING HIGHEST RELIABILITY SYNC MARK IN A SYNC MARK WINDOW OF A SPIRAL SERVO TRACK CROSSING

BACKGROUND

When manufacturing a disk drive, servo sectors $2_0$-$2_N$ are written to a disk 4 which define a plurality of radially-spaced, concentric data tracks 6 as shown in the prior art disk format of FIG. 1. Each data track 6 is partitioned into a plurality of data sectors wherein the servo sectors $2_0$-$2_N$ are considered "embedded" in the data sectors. Each servo sector (e.g., servo sector $2_4$) comprises a preamble 8 for synchronizing gain control and timing recovery, a sync mark 10 for synchronizing to a data field 12 comprising coarse head positioning information such as a track number, and servo bursts 14 which provide fine head positioning information. The coarse head position information is processed to position a head over a target track during a seek operation, and the servo bursts 14 are processed to maintain the head over a centerline of the target track while writing or reading data during a tracking operation.

In the past, external servo writers have been used to write the product servo sectors $2_0$-$2_N$ to the disk surface during manufacturing. External servo writers employ extremely accurate head positioning mechanics, such as a laser interferometer, to ensure the product servo sectors $2_0$-$2_N$ are written at the proper radial location from the outer diameter of the disk to the inner diameter of the disk. However, external servo writers are expensive and require a clean room environment so that a head positioning pin can be inserted into the head disk assembly (HDA) without contaminating the disk. Thus, external servo writers have become an expensive bottleneck in the disk drive manufacturing process.

The prior art has suggested various "self-servo" writing methods wherein the internal electronics of the disk drive are used to write the product servo sectors independent of an external servo writer. For example, U.S. Pat. No. 5,668,679 teaches a disk drive which performs a self-servo writing operation by writing a plurality of spiral servo tracks to the disk which are then processed to write the product servo sectors along a circular path. Each spiral servo track is written to the disk as a high frequency signal (with missing bits), wherein the position error signal (PES) for tracking is generated relative to time shifts in the detected location of the spiral servo tracks. The read signal is rectified and low pass filtered to generate a triangular envelope signal representing a spiral servo track crossing, wherein the location of the spiral servo track is detected by detecting a peak in the triangular envelope signal relative to a clock synchronized to the rotation of the disk.

DETAILED DESCRIPTION OF EMBODIMENTS OF THE INVENTION

Figure 2A:
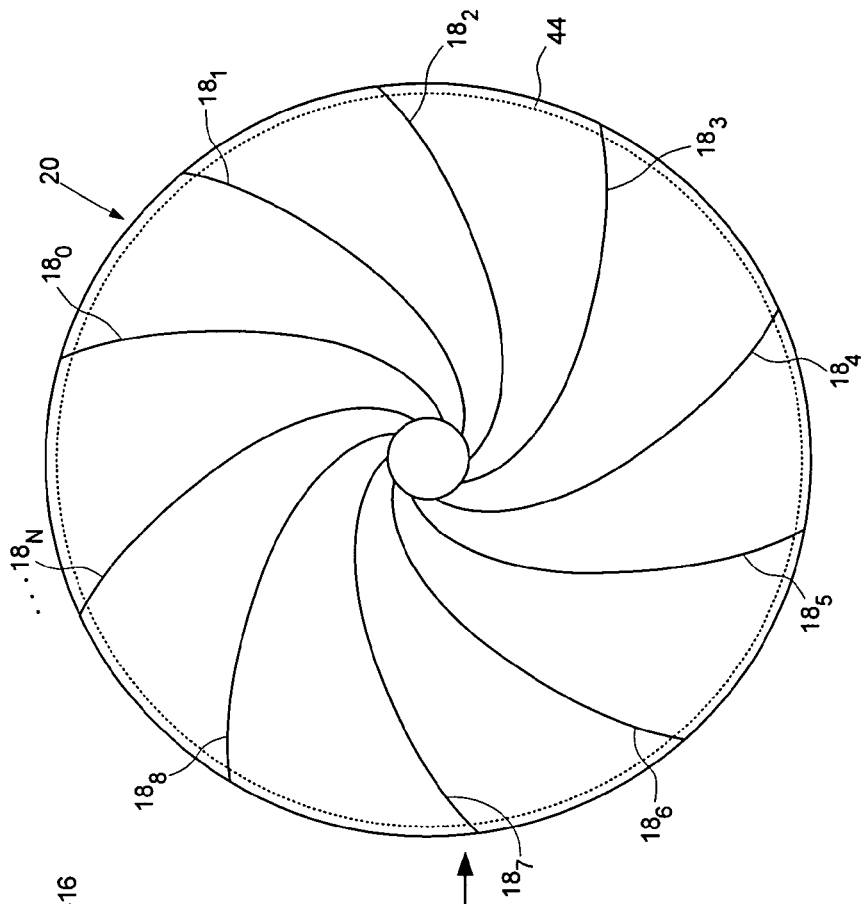
FIG. 2A shows an external spiral servo writer for writing spiral servo tracks to the disk according to an embodiment of the present invention.
Figure 2B:
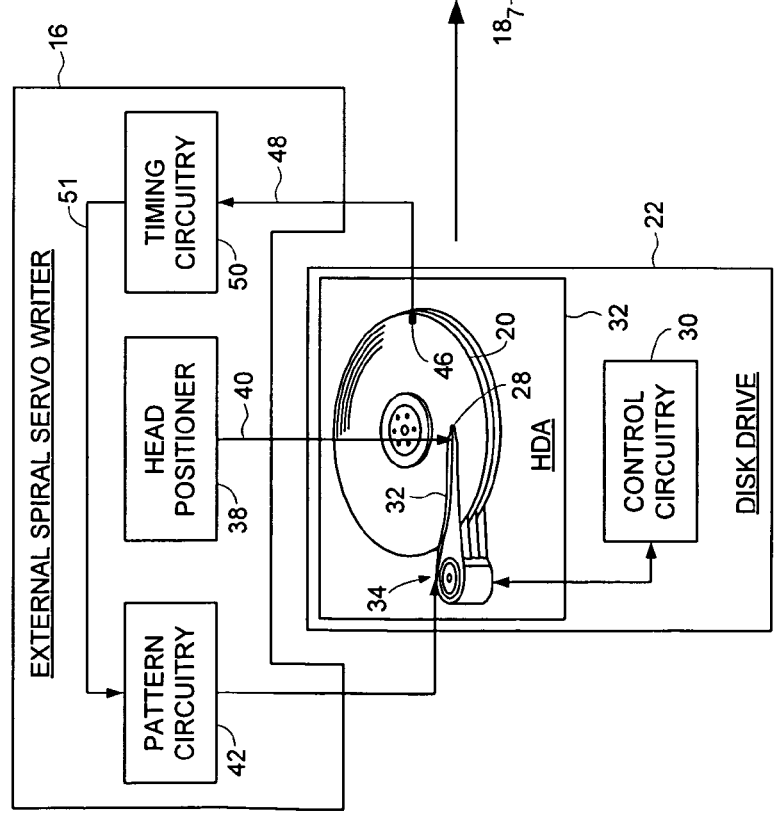
FIG. 2B shows spiral servo tracks written to the disk over a partial disk revolution according to an embodiment of the present invention.

FIGS. 2A and 2B show an external spiral servo writer 16 for writing a plurality of spiral servo tracks $18_0$-$18_N$ to a disk 20 of a disk drive 22. The spiral servo tracks $18_0$-$18_N$ may comprise any suitable pattern and may be written to the disk 20 using any suitable technique, such as using an external spiral servo writer for writing the spiral servo tracks to the disk as shown in FIG. 2A, or stamping the spiral servo tracks on the disk using magnetic printing techniques. In yet another embodiment, the disk drive 22 may self-servo write the spiral servo tracks $18_0$-$18_N$ to the disk 20.

In the embodiment of FIG. 2A, the disk drive 22 comprises control circuitry 30 and a head disk assembly (HDA) 32 comprising the disk 20, an actuator arm 32, the head 28 coupled to a distal end of the actuator arm 32, and a voice coil motor 34 for rotating the actuator arm 32 about a pivot to position the head 28 radially over the disk 20. A write clock is synchronized to the rotation of the disk 20, and the plurality of spiral servo tracks $18_0$-$18_N$ are written on the disk 20 at a predetermined circular location determined from the write clock.

The external spiral servo writer 16 comprises a head positioner 38 for actuating a head positioning pin 40 using sensitive positioning circuitry, such as a laser interferometer. Pattern circuitry 42 generates the data sequence written to the disk 20 for the spiral servo tracks $18_0$-$18_N$. The external spiral servo writer 16 inserts a clock head 46 into the HDA 32 for writing a clock track 44 (FIG. 2B) at an outer diameter of the disk 20. The clock head 46 then reads the clock track 44 to generate a clock signal 48 processed by timing recovery circuitry 50 to synchronize the write clock 51 for writing the spiral servo tracks $18_0$-$18_N$ to the disk 20. The timing recovery circuitry 50 enables the pattern circuitry 42 at the appropriate time relative to the write clock 51 so that the spiral servo tracks $18_0$-$18_N$ are written at the appropriate circular location. The timing recovery circuitry 50 also enables the pattern circuitry 42 relative to the write clock 51 to write the sync marks 26 (FIG. 4B) within the spiral servo tracks $18_0$-$18_N$ at the same circular location from the outer diameter to the inner diameter of the disk 20. As described below with reference to FIG. 5, the constant interval between sync marks 26 (independent of the radial location of the head 28) enables a servo write clock to maintain synchronization while writing the product servo sectors to the disk.

Figure 3:
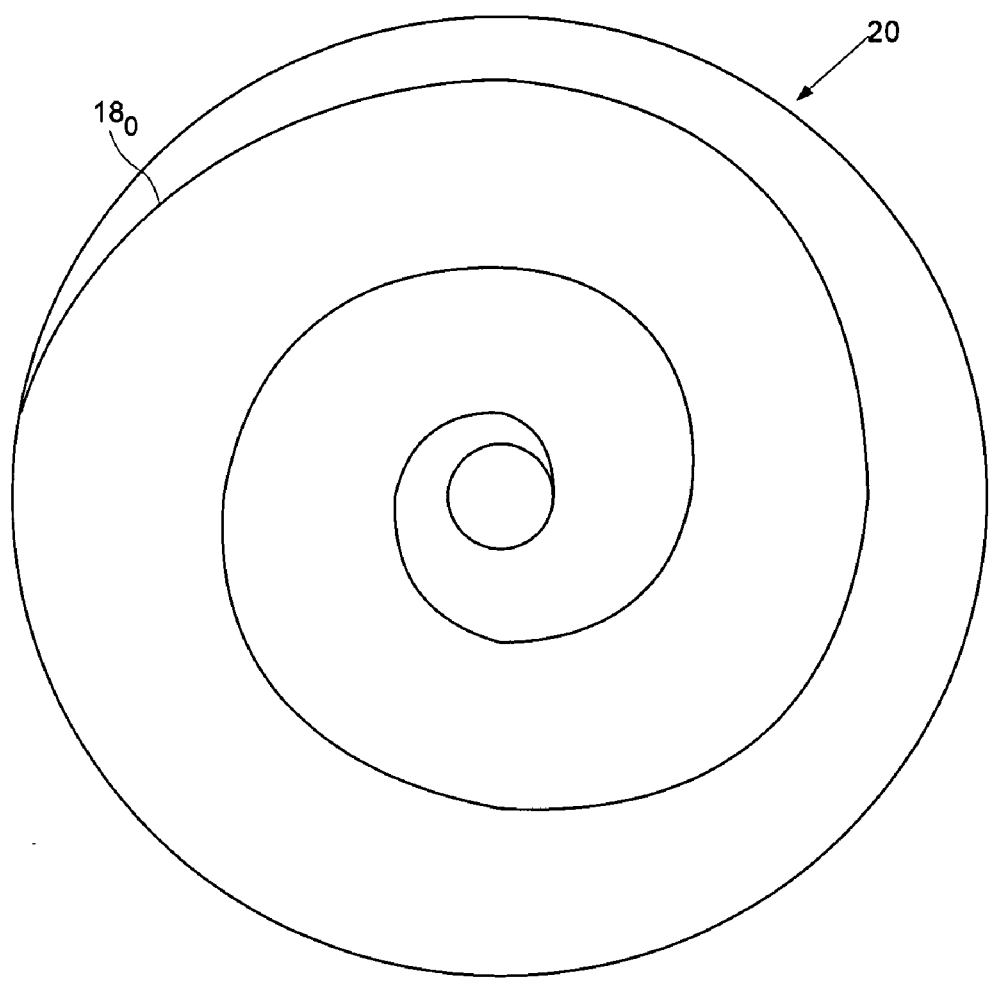
FIG. 3 illustrates an embodiment of the present invention wherein each spiral servo track is written over multiple revolutions of the disk.

In the embodiment of FIG. 2B, each spiral servo track $18_i$ is written over a partial revolution of the disk 20. In an alternative embodiment, each spiral servo track $18_i$ is written over one or more revolutions of the disk 20. FIG. 3 shows an embodiment wherein each spiral servo track $18_i$ is written over multiple revolutions of the disk 20.

In the embodiment of FIG. 2A, the entire disk drive 22 is shown as being inserted into the external spiral servo writer 16. In an alternative embodiment, only the HDA 32 is inserted into the external spiral servo writer 16. In yet another embodiment, an external media writer is used to write the spiral servo tracks $18_0$-$18_N$ to a number of disks 20, and one or more of the disks 20 are then inserted into an HDA 32. In still another embodiment, the control circuitry 30 within each disk drive 22 is used to write the spiral servo tracks $18_0$-$18_N$ to the disk 20.

Referring again to the embodiment of FIG. 2A, after the external spiral servo writer 16 writes the spiral servo tracks $18_0$-$18_N$ to the disk 20, the head positioning pin 40 and clock head 46 are removed from the HDA 32 and the product servo sectors are written to the disk 20. In one embodiment, the control circuitry 30 within the disk drive 22 is used to process the spiral servo tracks $18_0$-$18_N$ in order to write the product servo sectors to the disk 20. In an alternative embodiment, an external product servo writer is used to process the spiral servo tracks $18_0$-$18_N$ in order to write the product servo sectors to the disk 20 during a "fill operation".

Figure 4A:
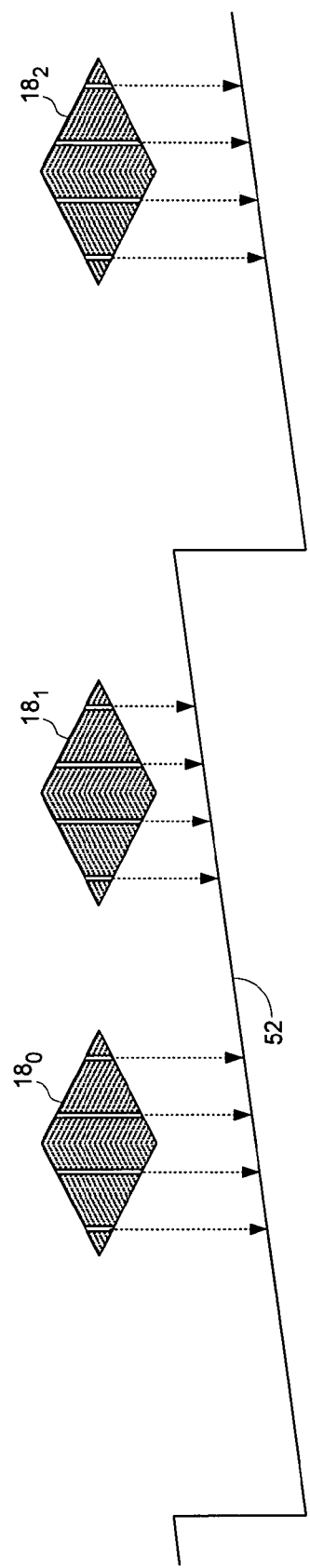
FIG. 4A shows an embodiment of the present invention wherein a servo write clock is synchronized by clocking a modulo-N counter relative to when the sync marks in the spiral servo tracks are detected.
Figure 4B:
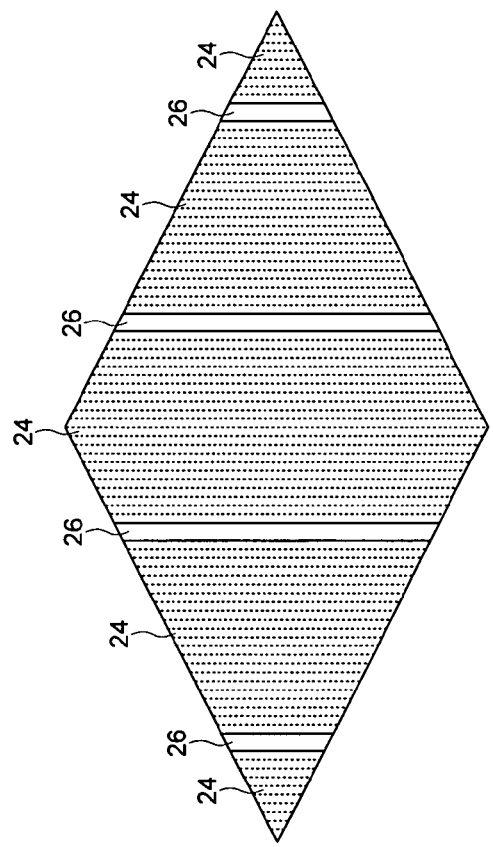
FIG. 4B shows an envelope generated by reading the spiral servo track, including the sync marks in the spiral servo track.

FIG. 4B illustrates an envelope in the read signal that is generated when the head 28 crosses over a spiral servo track 18. The read signal representing the spiral servo track comprises high frequency transitions 24 interrupted by sync marks 26. When the head 28 moves in the radial direction, the envelope will shift (left or right) while the sync marks 26 remain fixed. The shift in the envelope (detected from the high frequency signal 24) relative to the sync marks 26 provides the off-track information (position error signal or PES) for serving the head 28.

FIG. 4A shows an embodiment of the present invention wherein a saw-tooth waveform 52 is generated by clocking a modulo-N counter with the servo write clock, wherein the frequency of the servo write clock is adjusted until the sync marks 26 in the spiral servo tracks $18_0$-$18_N$ are detected at a target modulo-N count value. The servo write clock may be generated using any suitable circuitry, such as a phase locked loop (PLL). As each sync mark 26 in the spiral servo tracks $18_0$-$18_N$ is detected, the value of the modulo-N counter represents the phase error for adjusting the PLL. In one embodiment, the PLL is updated when any one of the plurality of sync marks 26 within the envelope is detected. In this manner the multiple sync marks 26 in each spiral servo track crossing provides redundancy so that the PLL is still updated if one or more of the sync marks 26 are missed due to noise in the read signal. Once the sync marks 26 are detected at the target modulo-N count values, the servo write clock is coarsely locked to the desired frequency for writing the product servo sectors to the disk 20.

Figure 1:
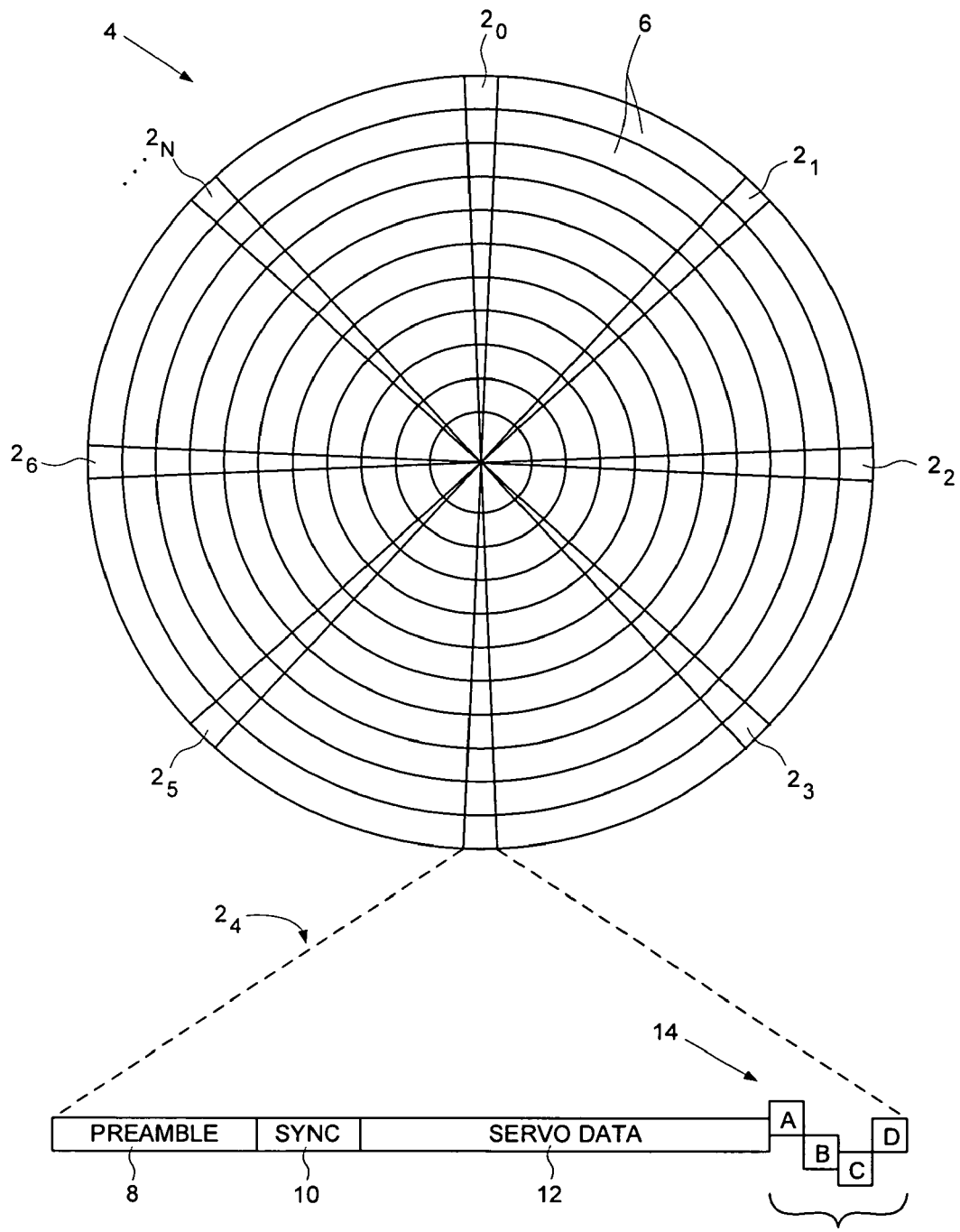
FIG. 1 shows a prior art disk format comprising a plurality of data tracks defined by a plurality of embedded servo sectors.

The sync marks 26 in the spiral servo tracks $18_0$-$18_N$ may comprise any suitable pattern, and in one embodiment, a pattern that is substantially shorter than the sync mark 10 in the conventional product servo sectors 2 of FIG. 1. A shorter sync mark 26 allows the spiral servo tracks $18_0$-$18_N$ to be written to the disk 20 using a steeper slope (by moving the head faster from the outer diameter to the inner diameter of the disk 20) which reduces the time required to write each spiral servo track $18_0$-$18_N$.

In one embodiment, the servo write clock is further synchronized by generating a timing recovery measurement from the high frequency signal 24 between the sync marks 26 in the spiral servo tracks $18_0$-$18_N$. Synchronizing the servo write clock to the high frequency signal 24 helps maintain proper radial alignment (phase coherency) of the Gray coded track addresses in the product servo sectors. The timing recovery measurement may be generated in any suitable manner. In one embodiment, the servo write clock is used to sample the high frequency signal 24 and the signal sample values are processed to generate the timing recovery measurement. The timing recovery measurement adjusts the phase of the servo write clock (PLL) so that the high frequency signal 24 is sampled synchronously. In this manner, the sync marks 26 provide a coarse timing recovery measurement and the high frequency signal 24 provides a fine timing recovery measurement for maintaining synchronization of the servo write clock.

Figure 5:
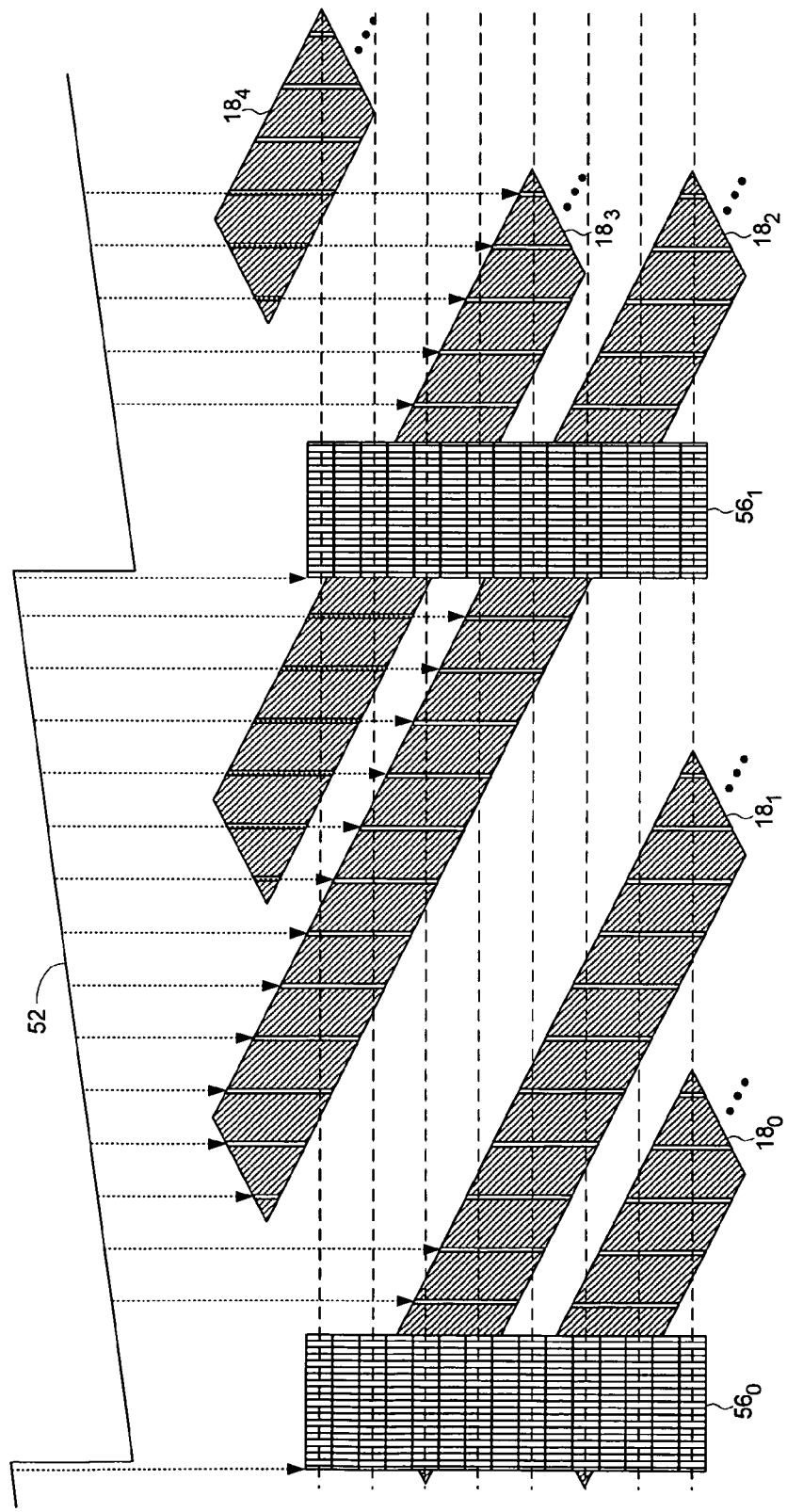
FIG. 5 illustrates writing of product servo sectors using a servo write clock generated from reading the spiral servo tracks.

FIG. 5 illustrates how the product servo sectors $56_0$-$56_N$ are written to the disk 20 after synchronizing the servo write clock in response to the high frequency signal 24 and the sync marks 26 in the spiral servo tracks $18_0$-$18_N$. In the embodiment of FIG. 5, the dashed lines represent the centerlines of the data tracks. The sync marks in the spiral servo tracks $18_0$-$18_N$ are written so that there is a shift of two sync marks 26 in the envelope (FIG. 4B) between data tracks. In an alternative embodiment, the sync marks 26 in the spiral servo tracks $18_0$-$18_N$ are written so that there is a shift of N sync marks in the envelope between data tracks. In the embodiment of FIG. 5, each spiral servo track $18_0$-$18_N$ is wider than a data track, however, in an alternative embodiment the width of each spiral servo track $18_0$-$18_N$ is less than or proximate the width of a data track.

Figure 6:
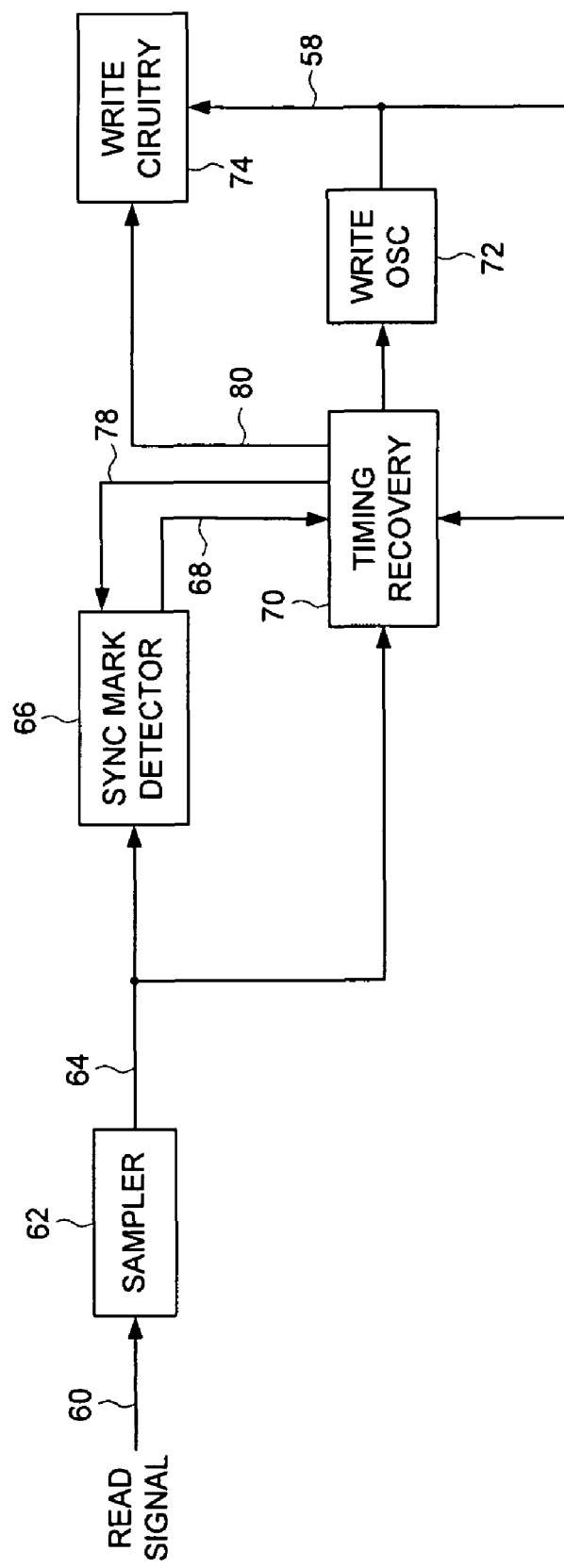
FIG. 6 shows circuitry according to an embodiment of the present invention for generating the servo write clock.

FIG. 6 shows details of control circuitry for synchronizing the servo write clock 58 according to an embodiment of the present invention. The read signal 60 emanating from the head 28 is sampled 62, and the read signal sample values 64 are processed by a sync mark detector 66 for detecting the sync marks 26 in the spiral tracks $18_0$-$18_N$. The sync mark detector 66 generates a sync mark detect signal 68 applied to a timing recovery circuit 70. The timing recovery circuit 70 processes the sync mark detect signal 68 to generate a coarse timing recovery measurement, and the read signal sample values 64 representing the high frequency signal 24 in the spiral tracks $18_0$-$18_N$ to generate a fine timing recovery measurement. The coarse and fine timing recovery measurements are combined to generate a control signal applied to a write oscillator 72 which outputs the servo write clock 58. The servo write clock 58 clocks operation of write circuitry 74 for writing the product servo sectors $56_0$-$56_N$ to the disk 20. The servo write clock 58 is also fed back into the timing recovery circuit 70 and used to generate the coarse timing recovery measurement. The timing recovery circuit 70 generates a sync mark window over line 78 for enabling the sync mark detector 66 during a window where a sync mark 26 is expected to occur. The timing recovery circuit 70 also generates a control signal over line 80 to enable the write circuitry 74 to begin writing a product servo sector at the appropriate time.

Figure 7:
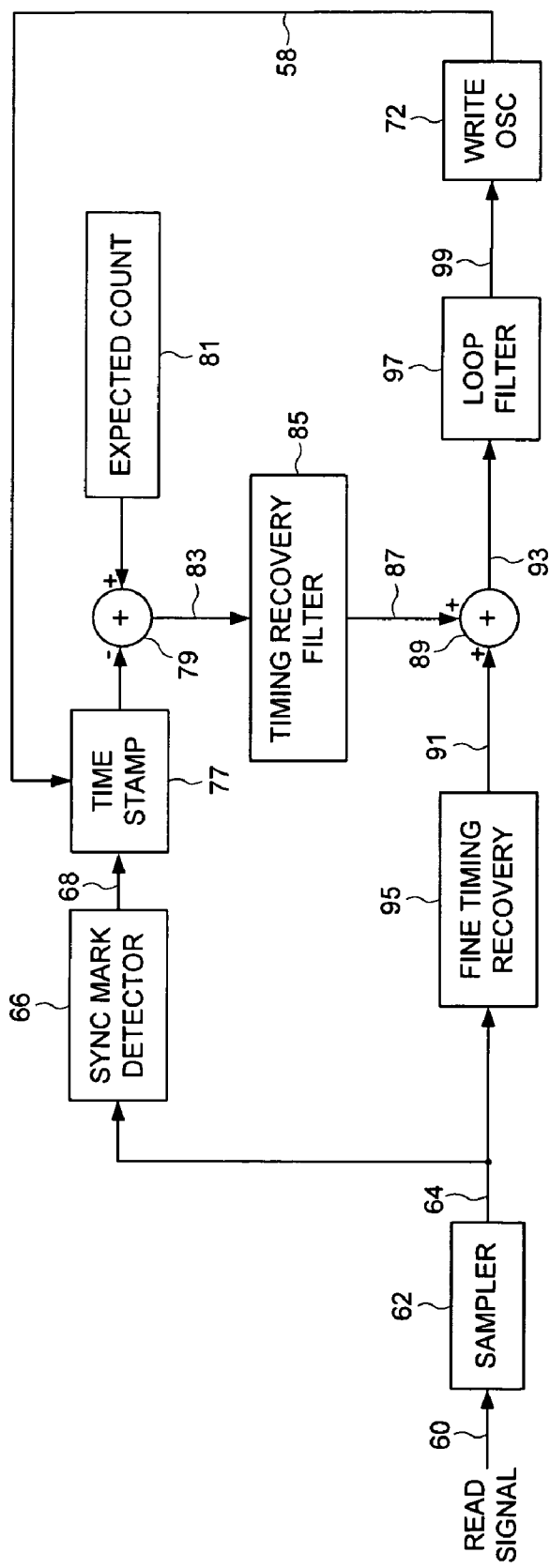
FIG. 7 shows an embodiment of the present invention wherein the timing recovery measurements generated from a plurality of the sync marks are filtered to generate a filtered timing recovery measurement combined with a fine timing recovery measurement.

FIG. 7 shows details of timing recovery circuitry for synchronizing the servo write clock 58 according to an example embodiment of the present invention. The sync mark detector 66 generates a sync mark detect signal 68 applied to a time stamp circuit 77 comprising the modulo-N counter clocked by the servo write clock 58. The time stamp circuit 77 outputs the value of the modulo-N counter as each sync mark is detected which is subtracted 79 from an expected count 81 to generate the coarse timing recovery measurement 83. A timing recovery filter 85 filters the coarse timing recovery measurements 83 to generate a filtered timing recovery measurement 87. The timing recovery filter 85 may comprise any suitable circuitry, such as an averaging circuit, a weighted averaging circuit, a finite impulse response filter, a state estimator, etc. The filtered timing recovery measurement 87 is combined 89 with a fine timing recovery measurement 91 to generate a combined timing recovery measurement 93, wherein the fine timing recovery measurement 91 is generated by a fine timing recovery circuit 95 in response to the read signal samples 64 representing the high frequency signal 24 in the spiral tracks crossing. The combined timing recovery measurement 93 is applied to a suitable PLL loop filter 97, wherein the output 99 of the loop filter 97 is applied to the write oscillator 72 which outputs the servo write clock 58.

Figure 8A:
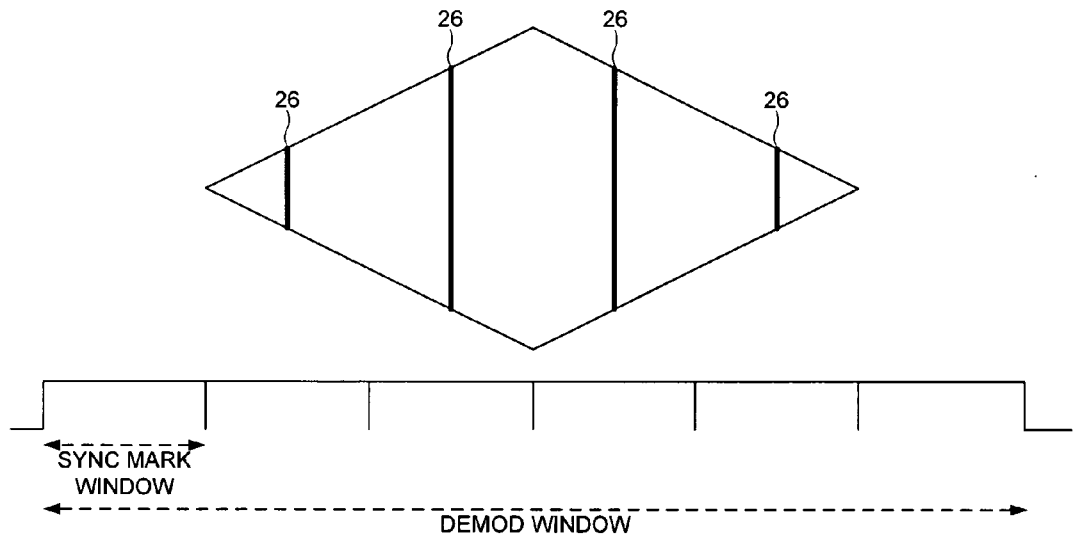
FIG. 8A shows an embodiment of the present invention wherein a demodulation window is enabled relative to a spiral servo track, and the demodulation window comprises a plurality of sync mark windows for detecting the sync marks within a spiral servo track crossing.
Figure 8B:
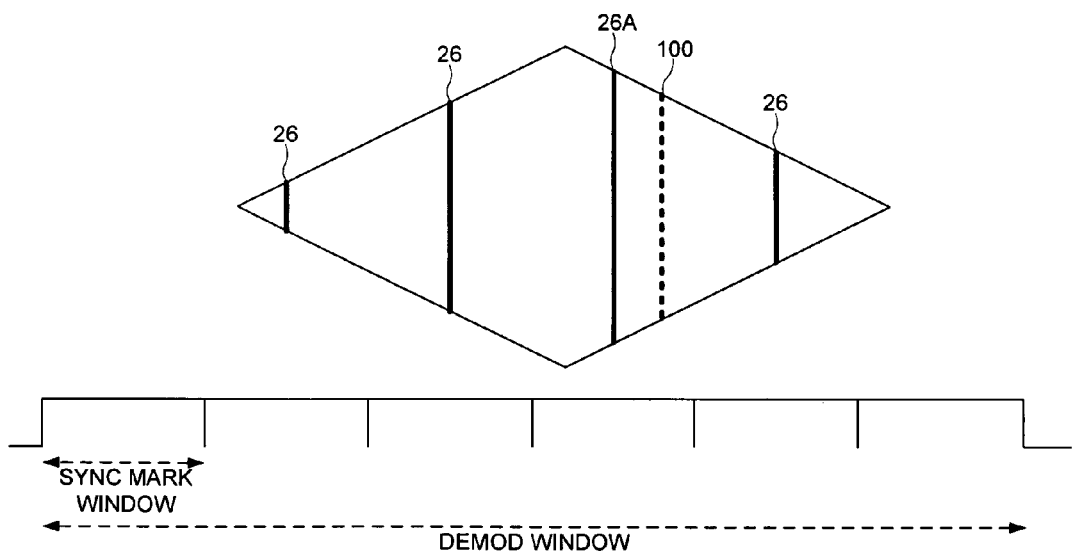
FIG. 8B shows an embodiment of the present invention wherein if multiple sync marks are detected within a sync mark window, the sync mark having the highest reliability metric is selected for synchronizing a clock (e.g., the servo write clock).

FIG. 8A illustrates an embodiment of the present invention wherein a demodulation window is enabled relative to a spiral servo track crossing. The demodulation window comprises a plurality of sync mark windows, wherein each sync mark window represents a time within the demodulation window that the sync mark 26 is expected to occur. FIG. 8B shows an example wherein a false sync mark 100 is detected within a sync mark window after detecting a true sync mark 26A. The false sync mark 100 will cause a significant disturbance if used to synchronize a clock (e.g., the servo write clock 58). Therefore, in one embodiment a reliability metric is generated for each detected sync mark within a sync mark window, and the sync mark having the highest reliability metric is selected to synchronize the clock.

Any suitable reliability metric may be generated for the detected sync marks within a sync mark window. In one embodiment, each reliability metric corresponds to a read signal amplitude of the corresponding detected sync mark, and in one embodiment, the sync mark corresponding to the highest read signal amplitude is selected. Referring again to FIG. 8B, the amplitude of the read signal when detecting the true sync mark 26A will be higher than the amplitude of the read signal when detecting the false sync mark 100 since the true sync mark 26A is detected closer to the center of the spiral servo tracking crossing where the signal amplitude is at a peak. A sync mark detected from a high read signal amplitude may be more reliable because the sync mark detector 66 is less likely to miss-detect the sync mark when the signal-to-noise ratio (SNR) is high. Other techniques may be employed to generate the reliability metrics, for example, by computing a mean squared error (MSE) between the read signal samples and the expected samples of a partial response signal.

Figure 9:
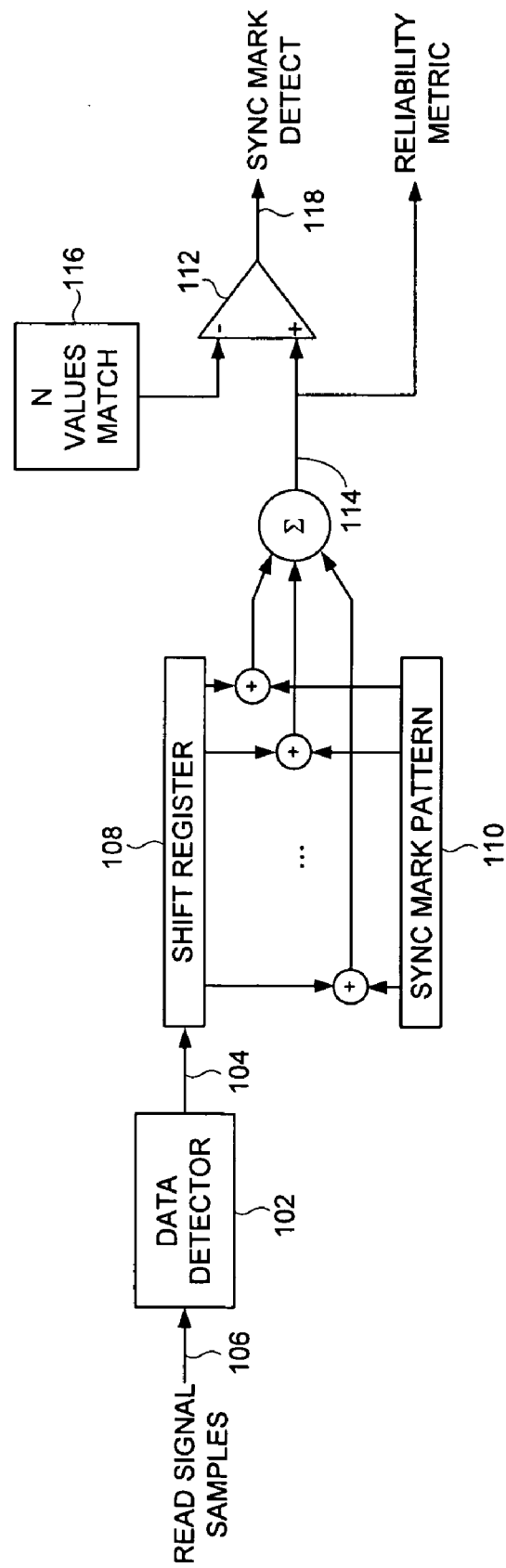
FIG. 9 shows a sync mark detector according to an embodiment of the present invention including a data detector (e.g., a Viterbi sequence detector) and a correlator for correlating an estimated data sequence with a target sync mark pattern.

The sync mark detector 66 may comprise any suitable circuitry for detecting the sync marks 26 in the spiral track crossing. FIG. 9 shows an embodiment of a sync mark detector comprising a data detector 102 (e.g., a Viterbi detector) for detecting an estimated data sequence 104 from read signal sample values 106. The estimated data sequence 104 is shifted into a shift register 108 and correlated with target values of a sync mark pattern. A comparator 112 compares an output 114 of the correlator to a threshold 116, wherein a sync mark is detected 118 when the correlation 114 exceeds the threshold 116. In other words, a sync mark is detected when N out of M values of the estimated data sequence 104 match N out of M values of the sync mark pattern. The estimated data sequence 104 and sync mark pattern 110 may comprise any suitable values, such as a binary sequence or a signed sample sequence of a partial response signal.

FIG. 9 also shows an embodiment of the present invention wherein the reliability metric for a detected sync mark is generated as the output 114 of the correlator. If multiple sync marks are detected within a sync mark window, the sync mark having the highest correlation value is selected to synchronize the clock (e.g., the servo write clock). If the detected sync marks have the same correlation level, then another reliability metric may be used to select the sync mark.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A method of demodulating a spiral servo track recorded on a disk, the spiral servo track comprising a high frequency signal interrupted by a sync mark at a sync mark interval, the method comprising:
    enabling a demodulation window relative to a spiral servo track crossing;
    searching for a sync mark within a sync mark window of the demodulation window, wherein the sync mark window represents a time within the demodulation window that the sync mark is expected to occur;
    detecting a plurality of sync marks in the sync mark window;
    generating a reliability metric for each of the detected sync marks;
    evaluating the reliability metrics to select one of the detected sync marks; and
    synchronizing a clock in response to the selected sync mark.

2. The method as recited in claim 1, wherein the clock comprises a servo write clock for writing concentric servo sectors to the disk.

3. The method as recited in claim 1, wherein each reliability metric corresponds to a signal amplitude of the corresponding detected sync mark.

4. The method as recited in claim 3, wherein each reliability metric further corresponds to a correlation value of the corresponding detected sync mark.

5. The method as recited in claim 1, wherein each reliability metric corresponds to a correlation value of the corresponding detected sync mark.

6. The method as recited in claim 1, wherein the detected sync mark having the highest signal amplitude is the selected sync mark.

7. The method as recited in claim 1, wherein the demodulation window comprises a plurality of sync mark windows corresponding to a plurality of expected sync marks within the spiral servo track crossing.

8. The method as recited in claim 7, wherein a plurality of sync marks may be detected within any one of the sync mark windows.

9. A disk drive comprising:
   a disk comprising a spiral servo track, the spiral servo track comprising a high frequency signal interrupted by a sync mark at a sync mark interval;
   a head actuated over the disk; and
   control circuitry operable to:
      enable a demodulation window relative to a spiral servo track crossing;
      search for a sync mark within a sync mark window of the demodulation window, wherein the sync mark window represents a time within the demodulation window that the sync mark is expected to occur;
      detect a plurality of sync marks in the sync mark window;
      generate a reliability metric for each of the detected sync marks;
      evaluate the reliability metrics to select one of the detected sync marks; and
      synchronize a clock in response to the selected sync mark.

10. The disk drive as recited in claim 9, wherein the clock comprises a servo write clock for writing concentric servo sectors to the disk.

11. The disk drive as recited in claim 9, wherein each reliability metric corresponds to a signal amplitude of the corresponding detected sync mark.

12. The disk drive as recited in claim 11, wherein each reliability metric further corresponds to a correlation value of the corresponding detected sync mark.

13. The disk drive as recited in claim 9, wherein each reliability metric corresponds to a correlation value of the corresponding detected sync mark.

14. The disk drive as recited in claim 9, wherein the detected sync mark having the highest signal amplitude is the selected sync mark.

15. The disk drive as recited in claim 9, wherein the demodulation window comprises a plurality of sync mark windows corresponding to a plurality of expected sync marks within the spiral servo track crossing.

16. The disk drive as recited in claim 15, wherein a plurality of sync marks may be detected within any one of the sync mark windows.

* * * * *